United States Patent [19]

Ito et al.

[11] Patent Number: 4,675,999
[45] Date of Patent: Jun. 30, 1987

[54] PORTABLE POWER TOOL EQUIPPED WITH DUST COLLECTOR

[75] Inventors: Masanori Ito; Seiji Akiba; Hiroyasu Ishikawa, all of Katsuta, Japan

[73] Assignee: Hitachi Koki Company, Ltd., Tokyo, Japan

[21] Appl. No.: 798,039

[22] Filed: Nov. 14, 1985

[30] Foreign Application Priority Data

Nov. 16, 1984 [JP] Japan ............................ 59-174850[U]
Jan. 28, 1985 [JP] Japan .................................. 60-14027
Apr. 19, 1985 [JP] Japan ............................. 60-59157[U]

[51] Int. Cl.$^4$ ............................................. B23D 47/00
[52] U.S. Cl. ........................................ 30/124; 30/390; 144/252 R
[58] Field of Search ............. 30/123, 124, 133, 166 R, 30/276, 388–391; 51/273; 83/100, 478; 144/252 R

[56] References Cited

U.S. PATENT DOCUMENTS

| | | | |
|---|---|---|---|
| 3,123,111 | 3/1964 | Mattson | 30/390 |
| 3,938,251 | 2/1976 | Kareman | 30/124 X |
| 4,192,104 | 3/1980 | Patenaude | 144/252 R X |
| 4,450,627 | 5/1984 | Morimoto | 30/391 |
| 4,466,187 | 8/1984 | Morimoto | 30/124 |

FOREIGN PATENT DOCUMENTS

| | | | |
|---|---|---|---|
| 0055896 | 7/1982 | European Pat. Off. | 391/ |
| 58-45865 | 3/1983 | Japan | 51/273 |

*Primary Examiner*—E. R. Kazenske
*Assistant Examiner*—Michael D. Folkerts
*Attorney, Agent, or Firm*—Pollock, Vande Sande & Priddy

[57] ABSTRACT

A portable power tool such as a portable circular saw is provided with a sawdust collection system based on the generation of an air flow resulting from rotation of a rotary cutting blade, with this air flow being guided to transport sawdust resulting from cutting operations along a guide path through a first discharge aperture into a dust box in which the sawdust is precipitated, with a low-velocity air flow then passing out of the dust box through a second discharge aperture to be recirculated through the flow path. Extremely effective dust collection is attained with a simple configuration, while the dust box can be positioned such that the weight of accumulated sawdust therein does not significantly affect the balance or ease of operation of the portable power tool.

10 Claims, 13 Drawing Figures

PRIOR ART

PORTABLE POWER TOOL EQUIPPED WITH DUST COLLECTOR

BACKGROUND OF THE INVENTION

Portable power tools such as portable circular saws powered by an electric motor are now widely utilized in various applications, for example in felling timber, cutting and shaping of logs, shaping stonework, etc. It is highly desirable that such portable power tools be provided with means for continuously collecting the small particles which are produced as a result of cutting or machining operations. For convenience of description, the general term "sawdust" will be employed in the following for such particles produced by cutting or machining operations, although it should be understood that these particles are not limited to wood but may comprise stone, plastic or other material, depending upon the particular material which is cut or machined. Preferably, such sawdust collection means should be of simple configuration, should permit the accumulated sawdust to be easily and rapidly removed by the operator when a sufficient amount has accumulated, and in addition should not unduly increase the external dimensions of the portable power tool. Furthermore, the sawdust collection means should be disposed in such a manner that the overall balance and ease of operation of the power tool are not seriously affected by the weight of a substantial amount of accumulated sawdust.

The above requirements are not satisfied by prior art dust collection arrangements for portable power tools, and it is an objective of the present invention to provide a portable power tool equipped with a sawdust collector system which fully meets these requirements.

SUMMARY OF THE INVENTION

The present invention is applicable to a portable power tool having a rotary cutting member, such as a portable circular saw having a rotary saw blade, and utilizes a current of air which is impelled by the angular rotation of the rotary cutting member. In general, a portable power tool according to the present invention has an electric motor together with a transmission mechanism including gears, etc., contained within and supported by a housing, the transmission being coupled to drive the rotating cutting member. A base is positioned below and attached to the latter housing, with a part of the rotary cutting member extending below the base, so that the cutting can be performed by placing a lower face of the base in contact with an object which is to be cut, and moving the cutting member against that object. An upper part of the cutting member extends above the base, and is substantially entirely enclosed within a cover which is attached to the housing. This cover is shaped in such a manner that an air flow passage is formed therein, along which a current of air is impelled due to rotation of the rotary cutting member. This air current carries sawdust, i.e. small particles produced as a result of the cutting operation. The latter air flow passage leads to a discharge aperture formed in the cover, which communicates with the interior of a container referred to in the following as a dust box. As a result of the sudden drop in velocity of the air current upon entry into the dust box interior, a large proportion of the sawdust thereupon falls to the base of an internal chamber formed within the dust box. Baffle plates are formed in the interior of the dust box to further reduce the velocity of the air current, and so produce further precipitation of sawdust particles. The air current and any residual light particles of sawdust which are carried along therewith then passes back from the dust box, through a second aperture formed therein communicating with a residual sawdust recycling aperture which is formed in the cover enclosing the cutting member, into the interior of that cover, to be recirculated back along the flow path described above.

It is an important feature of the present invention, resulting from the air flow path configuration described above, that the dust box can be mounted at a position such that the overall balance of the portable power tool will not be significantly affected by the weight of accumulated sawdust within the dust box. More specifically, the present invention enables the dust box to be positioned within a space which is formed between a front part of the housing (i.e. a part of the housing which faces towards an object being cut), a lateral face of a front portion of the cover formed over the rotary cutting member, and an upper face of a front part of the base. With a portable power tool according to the present invention, all or part of the cover of the rotating cutting member disposed on the opposite side of the cutting member to the dust box is formed of a transparent material. In this way, the operator can view the progress of cutting or shaping operations by directly observing the cutting position.

The dust box is also preferably formed of a transparent material, enabling the operator to readily judge the quantity of sawdust which has accumulated therein.

DESCRIPTION OF THE PREFERRED EMBODIMENTS

Figure 1:
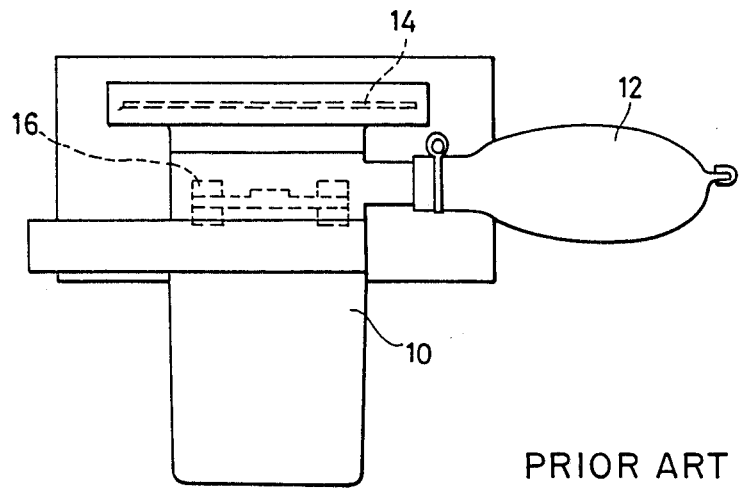
FIG. 1 is a plan view of an example of a prior art type of portable power tool equipped with a dust bag and fan for collection of sawdust.

Referring to the drawings, FIG. 1 shows a plan view of an example of a prior art type of portable power tool, i.e. a portable circular saw, which is equipped with a dust bag for collection of sawdust. As shown, the portable circular saw 10 has a dust bag 12 mounted thereon, protruding outward in a direction parallel to the plane of a rotary cutting blade 14. Sawdust produced by cutting operations is impelled into dust bag 12 by means of a fan 16. Such an arrangement has the disadvantage that the manufacturing cost of the saw will be increased due to the provision of impeller fan 16. In addition, due to the manner in which the dust bag 12 protrudes outward from the body of the saw, the weight of an accumulation of sawdust within dust bag 12 will result in an increase in the moment of inertia of the saw around its center of gravity, and make the saw unwieldy and awkward to operate.

Figure 2:
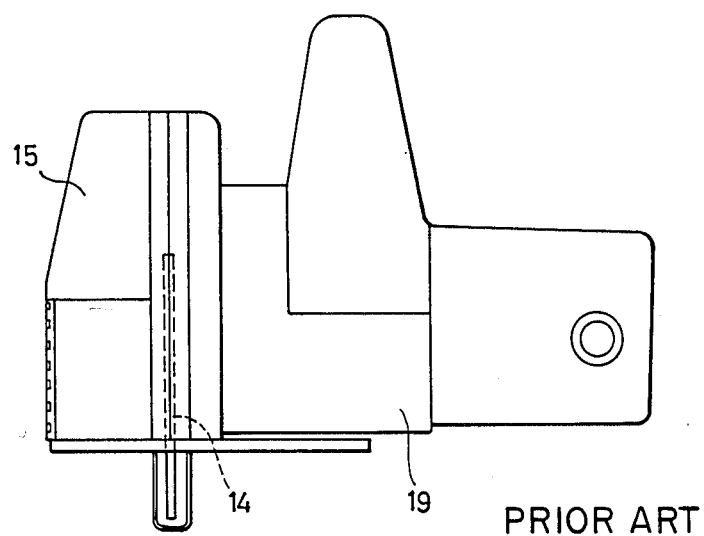
FIG. 2 is a front view of an example of a prior art type of portable power tool equipped with a dust box.

FIG. 2 is a front view of another prior art example of a portable circular saw equipped with sawdust collection means. In this example, a sawdust collection case 15 is mounted on the opposite side of the cutting blade 14 to a drive mechanism 19 (comprising an electric motor, gears, etc). Sawdust is driven into sawdust collection case 15 by an air flow resulting from rotation of the saw blade. However, due to the fact that the collection case must be mounted on the opposite side of the saw blade to the drive mechanism, the external dimensions of the saw are substantially increased, i.e. along the direction of the axis of rotation of saw blade 14. Furthermore, as in the case of the example of FIG. 1 above, the moment of inertia of the saw will increase as the weight of accumulated sawdust within collection case 15 increases, making the saw more difficult to operate. In addition, due to the fact that the sawdust collection case 15 protrudes outward from the saw blade, it will become impossible to perform cutting of certain shapes, since it will not be possible to bring the saw blade 14 into sufficiently close proximity to a desired cutting position due to the sideward protrusion of case 15.

Figure 3:
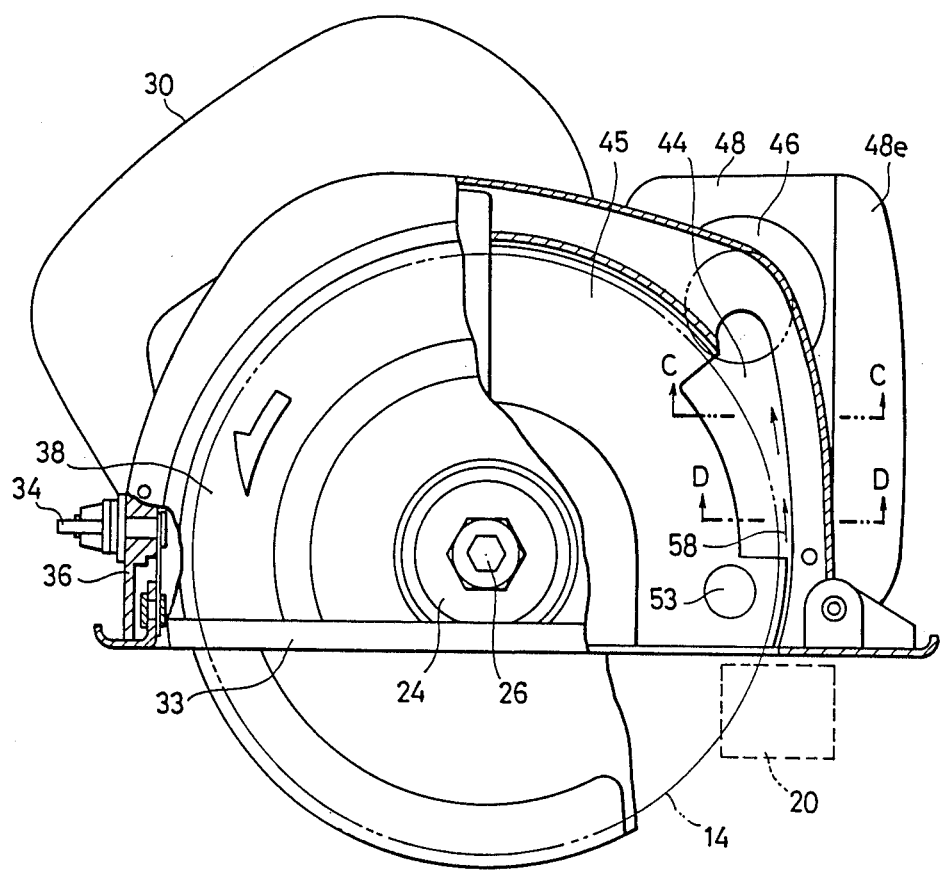
FIG. 3 is a view in side elevation and partial cross-section of an embodiment of a portable circular saw equipped with a dust collection system according to the present invention.
Figure 4:
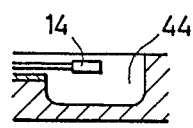
FIG. 4 and FIG. 5 are partial cross-sectional views taken along lines C—C and D—D in FIG. 3 respectively.
Figure 5:
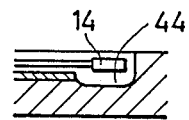
Figure 6:
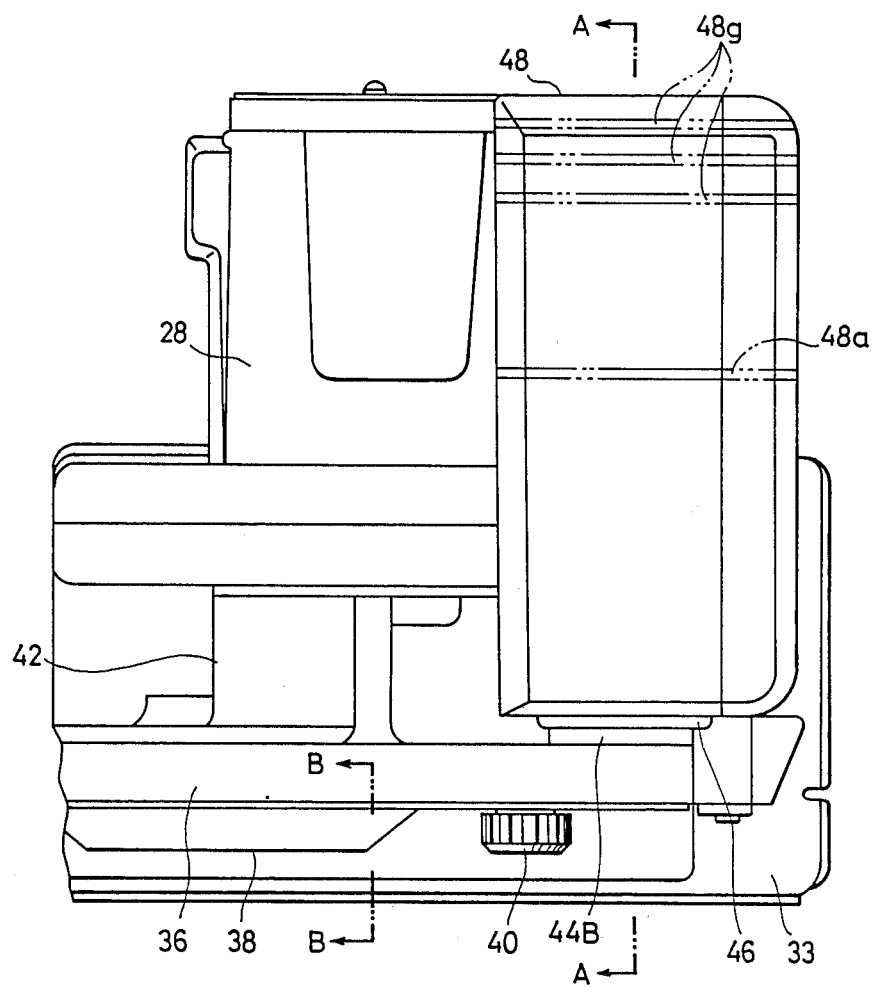
FIG. 6 is a plan view of the embodiment of FIG. 3.
Figure 7:
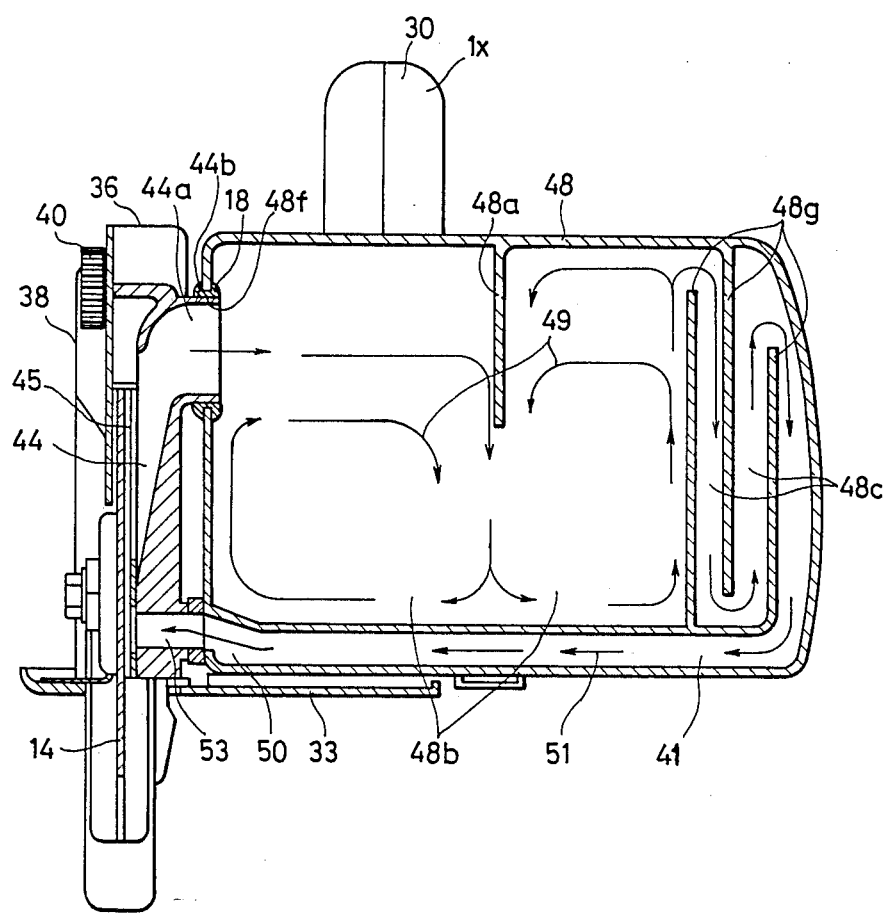
FIG. 7 is a cross-sectional view taken along line A—A in FIG. 6.
Figure 8:
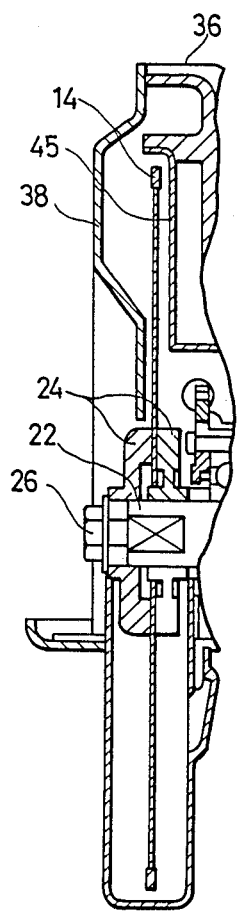
FIG. 8 is a partial cross-sectional view taken along line B—B in FIG. 6.

An embodiment of a portable circular saw having a dust collection system according to the present invention will now be described, referring to FIGS. 3, 4, 5, 6, 7 and 8. FIG. 3 is a partially cross-sectional view in elevation of this embodiment, as viewed from the opposite side of the saw blade to the drive mechanism, while FIGS. 4 and 5 are partial cross-sectional views taken along lines C—C and D—D in Fig. 3, respectively. FIG. 6 is a plan view of the exterior of the saw, while FIG. 7 is a cross-sectional view taken along line A—A in FIG. 6, and FIG. 8 is a partial cross-sectional view taken along line B—B in FIG. 6. It should be noted that the term "front", as used in the following specification and in the appended claims in referring to the positioning of component parts of the saw has the meaning of a position which is to the right of the axis of rotation of the blade of a portable circular saw, as seen in FIG. 3, i.e. at the side of the saw where the saw blade contacts the material which is being cut. Similarly the term "back" or "rear" denotes a position on the opposite side of the axis of rotation of the saw blade as seen in Fig. 3, i.e. the side of the saw where the operator is positioned when the saw is being utilized. Reference numeral 14 denotes a circular saw blade which is fixedly attached to a spindle 22 by a washer 24 and bolt 26. The spindle 22 is rotated by an electric motor which is contained within a housing 28, acting through transmission means including gears, etc. The electric motor and transmission means are omitted from the drawings. Reference numeral 30 denotes a carrying handle formed integrally with housing 28, and numeral 20 denotes material which is being cut by the saw. Reference numeral 33 denotes a base, which is attached to the body of the saw by means of a clamping screw 34 which can be slackened in order to adjust the position of base 33, to thereby vary the position at which material 20 is cut by saw blade 14. Reference numeral 36 denotes a saw cover, having an auxiliary saw cover 38 removably attached thereto by means of a clamping screw 40. The auxiliary saw cover 38 is formed of a transparent synthetic resin material in this embodiment, to permit the operator to clearly view the cutting operation. Saw cover 36 is integrally formed with a gear cover 42. The portion of saw blade 14 disposed above base 33 is thereby substantially entirely enclosed by saw cover 36 and auxiliary saw cover 38. The portion of auxiliary saw cover 38 which is disposed to the rear of the center thereof (i.e. the part of auxiliary saw cover 38 at the left, in FIG. 3) is expanded outward close to the periphery thereof, in a manner which is illustrated in FIG. 8, so that this part of the side of auxiliary saw cover 38 is spaced apart from the opposing lateral face of saw blade 14. The periphery of that portion of auxiliary saw cover 38 which is disposed forward of the center thereof (i.e. the portion shown at the right side, in FIG. 3) is of flat shape, with the inner surface thereof positioned close to the opposing lateral face of saw blade 14, as shown in FIG. 7. In addition, a channel of gradually increasing cross-sectional area is formed in the front portion of saw cover 36 illustrated in FIGS. 3, 4 and 5. The cross-sectional area of this channel, which is disposed around a portion of the periphery of saw blade 14 as shown, increases along a direction substantially tangential to the direction of rotation of saw blade 14. In this way, an enclosed sawdust transfer passage, denoted by reference numeral 44, is defined by this expanding channel portion of saw cover 36 in conjunction with a seal plate 45 (which is internally attached to gear cover 42 and serves to prevent entry of sawdust among the gears) and auxiliary saw cover 38. The sawdust transfer passage 44 leads to a sawdust discharge aperture 44a, which is defined by a short tubular outwardly protruding extension 44b of gear cover 42. A packing ring 46 formed of flexible material such as rubber is mounted around the inner periphery of an inlet aperture 48f of a sawdust collection receptacle which is referred to in the following as dust box 48. The outer periphery of sawdust discharge tube 44b is shaped such as to fit tightly within packing ring 46 in a closely fitting manner such that with tubular extension 44b plugged into packing ring 46 as shown in FIG. 7, the dust box 48 is held removably attached to the body of the saw and supported thereby. The dust box 48 is formed of a transparent material, enabling the user to ascertain the amount of sawdust accumulated therein. An outlet aperture 50 of dust box 48 is positioned in correspondence with a residual sawdust recycling passage 53 formed in gear cover 42 at a position close to that part of the periphery of saw blade 14 which contacts the material 20 which is being cut, as illustrated in FIG. 3, and immediately below and adjacent to the channel portion of gear cover 42 defining the sawdust transfer passage 44 as described above.

Within the interior of dust box 48, a sawdust storage chamber 48b is formed, having a baffle plate 48a formed therein protruding vertically downward from the top of storage chamber 48b, facing the inlet aperture 48f. A further set of successively positioned baffle plates, denoted as 48g, define an air flow guidance chamber 48c which leads to a recycling passage 41, which in turn leads to the outlet aperture 50 of dust box 48 and hence to the residual sawdust recycling passage 53.

The operation of this embodiment is as follows. When the saw is in operation, with saw blade 14 in rapid rotation and cutting into material 20 to thereby produce sawdust, the rotation of saw blade 14 in conjunction with the shape of the auxiliary saw cover 38 and of the sawdust transfer passage 44 results in an inward flow of air, as indicated by numeral 58 in Fig. 3, into sawdust transfer passage 44, with the sawdust produced by the cutting operation being carried upward along with this air flow through sawdust transfer passage 44. Due to the fact that the cross-sectional area of sawdust transfer passage 44 gradually increases as the air flow moves towards discharge aperture 44a, the velocity of the air flow is gradually decreased. When the flow of air and sawdust exits through discharge aperture 44a into the interior of dust box 48, i.e. suddenly enters a large open space, there is a further considerable drop in the air flow rate. As a result, a large proportion of the sawdust particles which are carried by the air flow, being heavier than air, will drop to the bottom of sawdust storage chamber 48b. As the air flow continues onward, it impinges against baffle plate 48a, resulting in a further reduction of flow velocity. The air current then circulates around the interior of the two portions of sawdust storage chamber 48b which are defined by baffle plate 48a, as indicated by arrows 49 in FIG. 7, with further lowering of the flow velocity and corresponding precipitation of sawdust thereby occurring. The air current then flows past baffle plates 48g in succession, to then enter the recycling passage 41. At this point the air flow rate is extremely low, and only the very lightest particles of sawdust remain carried along by the air current, indicated by arrow 51. This current, with the lightest sawdust particles, then flows through outlet aperture 50 of dust box 48 and residual sawdust recycling passage 53 of gear cover 42 back into the sawdust transfer passage 44, and is then recirculated around the path described above, back through dust box 48.

In this way, all of the sawdust other than the very lightest particles will accumulate within dust box 48, while in addition these light sawdust particles will remain within the air flow path described above. It can thus be understood that such a sawdust collection system, while extremely simple in configuration, is highly effective.

Figure 9:
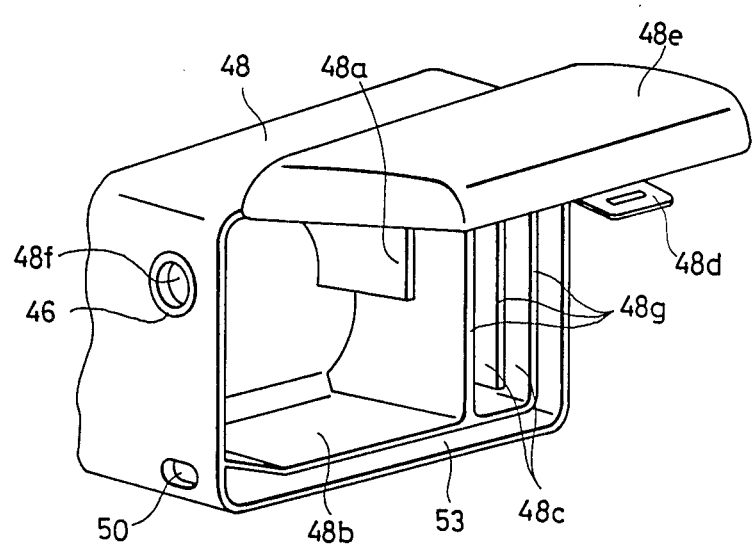
FIG. 9 is an oblique partial view illustrating the way in which a dust box of the embodiment of FIG. 3 is opened to remove accumulated sawdust.
Figure 10:
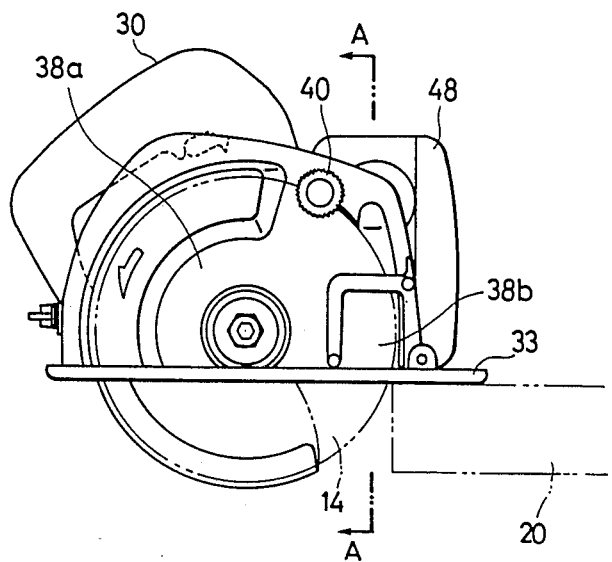
FIG. 10 is a side view in elevation of a second embodiment of a portable circular saw according to the present invention, equipped with a glass observation window.
Figure 11:
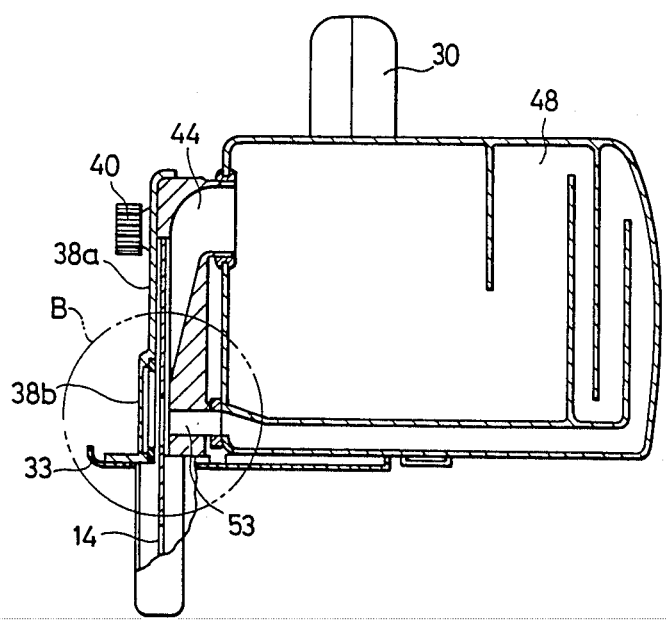
FIG. 11 is a cross-sectional view of the embodiment of FIG. 10, taken along line A—A.
Figure 12:
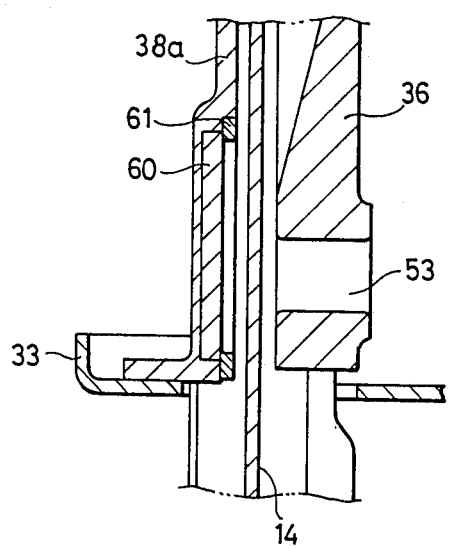
FIG. 12 is a partial cross-sectional view of the embodiment of FIG. 10 to illustrate details of the glass observation window configuration.

The dust box 48 is provided with a hinged case cover 48e, which can be opened as shown in FIG. 9 by releasing a catch 48d, whereupon the accumulated sawdust can be easily and rapidly disposed of. Since dust box 48 is formed of a transparent material, the operator can readily judge when the amount of accumulated sawdust has reached a level at which it must be removed.

As described above, dust box 48 is removably attached to the body of the saw by plugging discharge protruding extension 44b into inlet aperture 48f of dust box 48. In this way, extremely simple attachment means are provided for dust box 48, which are combined with the structure forming the sawdust transfer passage 44 which leads sawdust into dust box 48.

Referring again to FIG. 6, it should be noted that the configuration of this embodiment is such that the dust box 48 can be positioned at the front of the saw, above the base 33, and on the same side of saw blade 14 as the drive mechanism where the expression "same side of saw blade 14" has the significance "same side of a plane of rotation of saw blade 14". More specifically, the dust box 48 is positioned within a space which is bounded on one side by the front of the housing 28 enclosing the drive mechanism, on another side by a lateral face of the front part of saw cover 38, and on the lower side by a part of the upper surface of the front of base 33, with the term "front" having the meaning defined hereinabove. With such a positioning of dust box 48, the weight of accumulated sawdust within dust box 48 will have only a minimal effect upon the moment of inertia of the saw around its center of gravity and the saw will retain good balance and ease of operation even when a large quantity of sawdust has accumulated within dust box 48. It should be noted that such a position for dust box 48 is made possible by the use of the air flow path described above, and that the presence of the transmission components including gears, etc., which drive the saw blade 14, and also the presence of seal plate 45 (which is essential for preventing entry of sawdust among the transmission components) would make it extremely difficult to effectively employ a simple conventional type of dust box in the position of dust box 48 of this embodiment.

Figure 13:
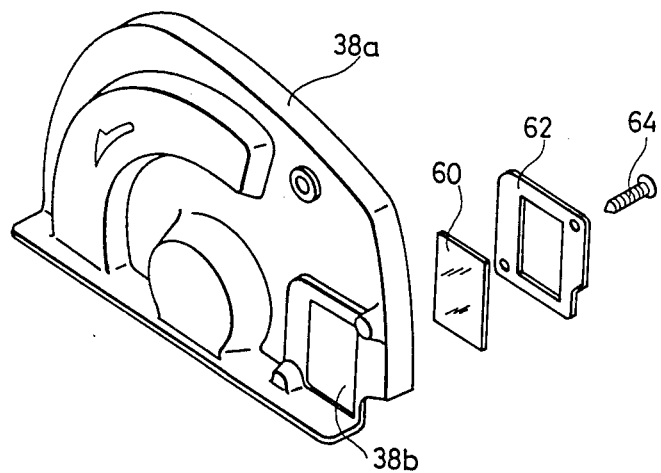
FIG. 13 is a partial oblique external view of the embodiment of FIG. 10, to illustrate the manner of attachment of the glass observation window.

In the embodiment desribed above, the auxiliary saw cover 38 is formed of a transparent material, such as a synthetic resin or other plastic, to enable the user to view the progress of cutting operations by directly observing the cutting portion of saw blade 14. It should be noted that such viewing is facilitated by the presence of residual sawdust recycling passage 53, since light can pass through the transparent walls of dust box 48 and hence through passage 53. As described above, only a current of air carrying a small amount of very light particles of sawdust passes through residual sawdust recycling passage 53, so that no substantial obstruction of this light will occur. However although a synthetic resin or other plastic material is extremely resistant to impacts, e.g. resulting from dropping upon the ground, it has poor resistance to abrasion. Glass, on the other hand has excellent resistance to abrasion, but poor impact resistance. A second embodiment of a portable circular saw according to the present invention will now be described, referring to FIGS. 10, 11, 12 and 13, in which the properties of each type of transparent material are utilized in an optimum manner. In these drawings, components corresponding to identical components in the first embodiment described above are designated by corresponding reference numerals. Reference numeral 38a denotes an auxiliary saw cover, whose function and configuration are similar to those of the auxiliary saw cover 38 in the first embodiment, and which is formed of a transparent synthetic resin material, but which is further provided with a window aperture 38b formed therein at a position directly opposite to residual sawdust recycling passage 53. A transparent plate 60, formed of glass, is removably attached in window aperture 38b by means of screws 64 and a frame 62 as shown in FIG. 13. Thus, if transparent plate 60 becomes scratched or broken after a long period of use, it can be rapidly and easily replaced.

In this way, as a result of illumination by light passing through residual sawdust recycling passage 53, the operator is provided with a clear view of the position at which saw blade 14 contacts the material 20 which is being cut.

The invention has been described in the above with reference to portable circular saw embodiments. However, it will be apparent that the invention is not limited to use with a portable circular saw, but that such a sawdust collection system may be applied to other types of portable power tools which employ a large-diameter rotating member for cutting or machining operations. Thus although the present invention has been described with reference to specific embodiments, various changes and modifications to the embodiments may be envisaged, which fall within the scope claimed for the invention as set out in the appended claims. The above specification should therefore be interpreted in a descriptive and not in a limiting sense.

What is claimed is

1. A portable power tool comprising:
    motor drive means and transmission means coupled thereto;
    housing means for enclosing and supporting said motor drive means and transmission means;
    a base positioned below said housing means and attached thereto;
    a rotary cutting member coupled to said transmission means to be rotated thereby, a part of said rotary cutting member being positioned above said base and said motor drive means being positioned on one side of said rotary cutting member with respect to a plane of rotation of said rotary cutting member;
    cover means attached to said housing means for substantially entirely enclosing said part of said rotary cutting member positioned above said base, said cover means having a sawdust discharge aperture and a residual sawdust recycling aperture formed therein, said cover means moreover being internally shaped in a manner defining a sawdust transfer passage for directing a current of air resulting from rotation of said rotary cutting member into said sawdust discharge aperture; and
    a dust box mounted above said base, positioned entirely on the same side of said rotary cutting member with respect to said plane of rotation as said motor drive means and moreover positioned within a space formed between a front portion of said housing means, a lateral face of a front portion of said cover means, and an upper face of a front portion of said base, said dust box having at least one internal chamber for accumulation of dust particles produced by operation of said rotary cutting member, and further having an inlet aperture formed therein positioned to communicate with said sawdust discharge aperture of said cover means and an outlet aperture positioned to communicate with said residual dust recycling aperture of said cover means.

2. A portable power tool according to claim 1 in which said portable power tool is a portable circular saw and in which said rotary cutting member is a circular saw blade.

3. A portable power tool according to claim 1, in which said cover means of said rotary cutting member is shaped such that a front portion thereof which surrounds a front portion of said rotary cutting member is formed with substantially flat internal lateral faces which are positioned in close proximity to lateral faces of said rotary cutting member opposed thereto, while a rear portion thereof which surrounds a rear portion of said rotary cutting member is formed with outwardly expanded side faces spaced substantially apart from lateral faces of said rotary cutting member opposed thereto.

4. A portable power tool according to claim 1, and further comprising at least one baffle plate positioned within said internal chamber of said dust box such as to reduce a velocity of flow of an air current passed therethrough for thereby inducing precipitation of said dust particles within said internal chamber.

5. A portable power tool according to claim 1, and further comprising means for removably attaching said dust box to said portable power tool.

6. A portable power tool according to claim 5, in which said removable attachment means comprises a short tubular extension of said cover means leading outward from said sawdust discharge aperture, and resilient packing means adapted to fit closely between the outer periphery of said tubular extension and the inner periphery of said inlet aperture of said dust box.

7. A portable power tool according to claim 1, in which at least a part of said cover means is formed of a transparent material.

8. A portable power tool according to claim 7, in which said cover means comprises a first cover member which is integrally formed with said housing means and a second cover member which is formed of a transparent material and which is removably attached to said first cover member.

9. A portable power tool according to claim 1, in which said dust box is formed of a transparent material.

10. A portable power tool according to claim 9, in which a window aperture is formed in said cover means on the opposite side thereof to said dust box, at a position immediately opposite to said residual dust re-entry aperture, and further comprising a glass plate which is removably attached in said window aperture.

* * * * *